US008549726B2

(12) United States Patent
Washburn

(10) Patent No.: US 8,549,726 B2
(45) Date of Patent: Oct. 8, 2013

(54) SNOWMAN FRAME AND METHOD FOR USE

(76) Inventor: Phyllis Washburn, Forest City, NC (US)

( * ) Notice: Subject to any disclaimer, the term of this patent is extended or adjusted under 35 U.S.C. 154(b) by 384 days.

(21) Appl. No.: 12/945,847

(22) Filed: Nov. 13, 2010

(65) Prior Publication Data

US 2011/0277310 A1 Nov. 17, 2011

Related U.S. Application Data

(60) Provisional application No. 61/334,660, filed on May 14, 2010.

(51) Int. Cl.
*B23P 17/00* (2006.01)
*B29C 33/38* (2006.01)

(52) U.S. Cl.
USPC ........... 29/527.1; 29/897; 29/453; 29/525.01; 249/139; 446/97; 446/71; 446/73; 446/74

(58) Field of Classification Search
USPC ........... 29/897, 525.01, 453, 527.1; 249/139; 446/97, 71, 73, 74
See application file for complete search history.

(56) References Cited

U.S. PATENT DOCUMENTS

| | | | | |
|---|---|---|---|---|
| 3,841,019 | A | 10/1974 | Lorenzo | |
| 5,380,237 | A | 1/1995 | Kenyon | |
| D375,964 | S | 11/1996 | Poubouridis | |
| 5,632,926 | A | 5/1997 | Dyer | |
| D382,317 | S | 8/1997 | Huston | |
| D435,069 | S | 12/2000 | Berardelli | |
| 6,176,464 | B1 | 1/2001 | Harvey | |
| 6,379,021 | B1 * | 4/2002 | Shieh | 362/123 |
| D535,348 | S | 1/2007 | Sammann | |
| 7,178,342 | B1 | 2/2007 | Knapp | |
| 2006/0172654 | A1 * | 8/2006 | Asperas | 446/97 |

* cited by examiner

*Primary Examiner* — David Bryant
*Assistant Examiner* — Lawrence Burkart
(74) *Attorney, Agent, or Firm* — Richard Mark Blank, Esq.

(57) ABSTRACT

The present invention relates to a simple and easy to make snowman with a limited amount of snow. The system does not require the lifting of heavy snow balls, typically used in the making of a snowman, and provides for small children to be able to handle the snow without adult help. Further, this invention provides a quick and affective decorating system which can be reused and positioned securely anywhere on the figure.

14 Claims, 5 Drawing Sheets

SNOWMAN FRAME AND METHOD FOR USE

This application claims the benefit under 35 U.S.C. 119(e) of any U.S. provisional application(s) listed below. Application No. 61/334,660 Filing date May 14, 2010.

FIELD OF THE INVENTION

The invention relates to a frame and a method for building a full size, 6' snowman with a minimal amount of snow, typically only requiring a light snowfall of 2 to 3 inches of snow on the ground. The frame is lightweight for easy carrying and can be disassembled and nested together for easy and convenient storage. The frame is covered with a wire or stiff cloth mesh that will allow the snow to stick to the surface of the frame, so that only a thin coating of snow on the frame will suffice to create the desired snowman. Additionally, the frame is assembled in place and snow is placed on the frame, thus eliminating the need to lift the middle and upper balls of snow as required in a traditional snowman.

BACKGROUND OF THE INVENTION

In many places in the world that receive snow, building snowmen has long been a winter activity that children and adults partake in. The traditional way of making a snowman is to roll a ball of snow along the ground until it reaches the desired size. Switching direction in which the ball is rolled from time to time to keep the ball round and uniform. Once the proper and desired bottom ball has been formed, the middle ball is made in the same fashion, only slightly smaller. The middle ball is lifted onto the bottom ball and forms the torso of the snowman. Next the top ball is made in the same fashion and even smaller and again lifted onto the top of the middle ball. For a sizable snowman, one would recognize that the middle and top balls are heavy and will take multi people to lift into place. One would also realize that a fair amount of snow is required to form the large balls without having to roll the forming ball a long distance.

Once the balls are in place, the snow can be trimmed by hand or with a small shovel or similar device to smooth and sculpt the figure. These snowmen can range from very simple to very elaborate and can be further ornamented with structures such as a nose, mouth, arms and clothing. Typical snowmen will have a carrot for a mouth and branches to represent the arms. Light can even be added for night viewing. The extent of what can be done is only limited only to the creators imagination.

There still exists a need for an easy to create snowman without the heavy manual labor involved. Additionally, it would be ideal if the snowman can be created by a person of any age and without the need for a deep snow covering the ground.

DESCRIPTION LIST

Figure 1:
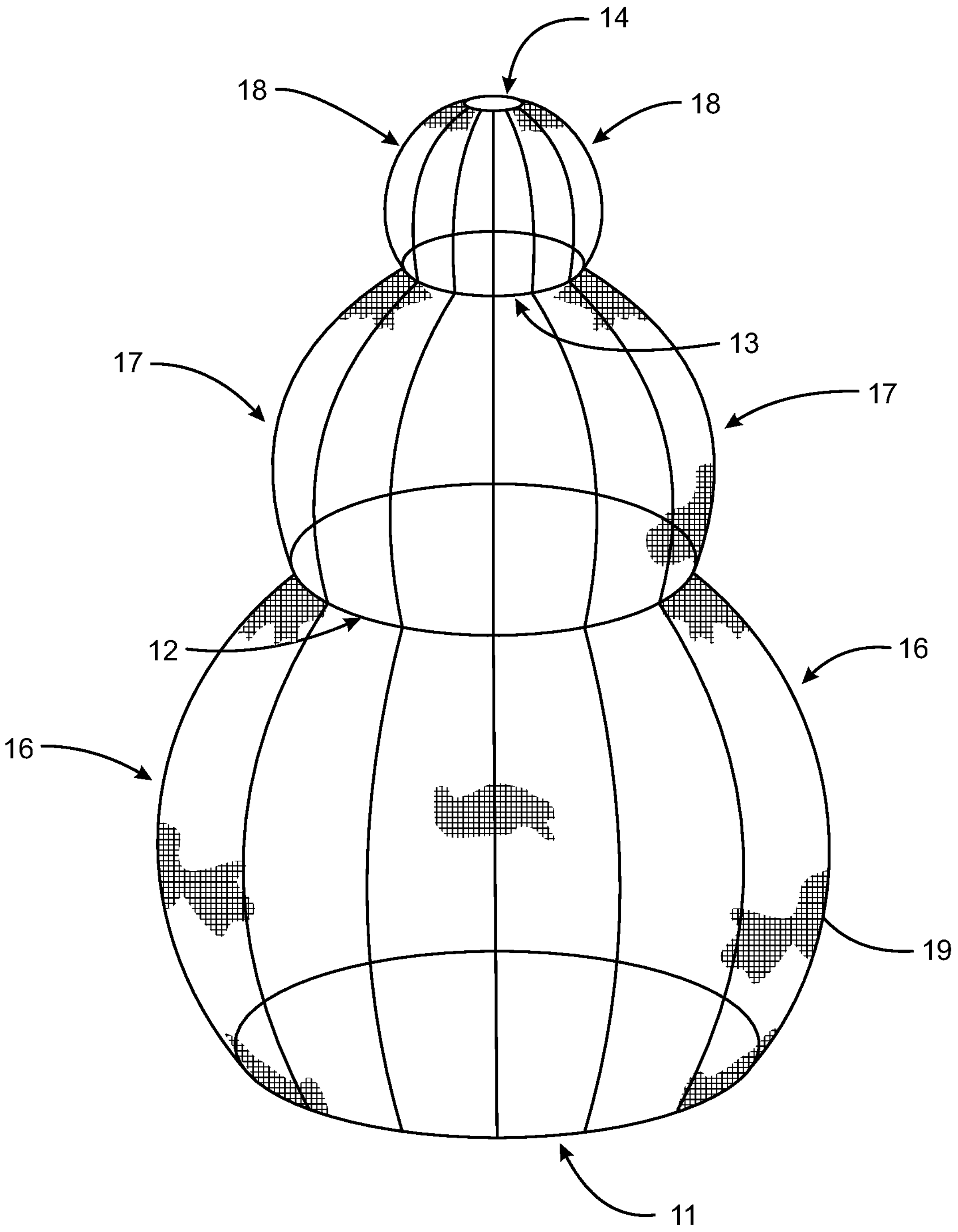
FIG. 1: is a perspective view of the invention.
Figure 2:
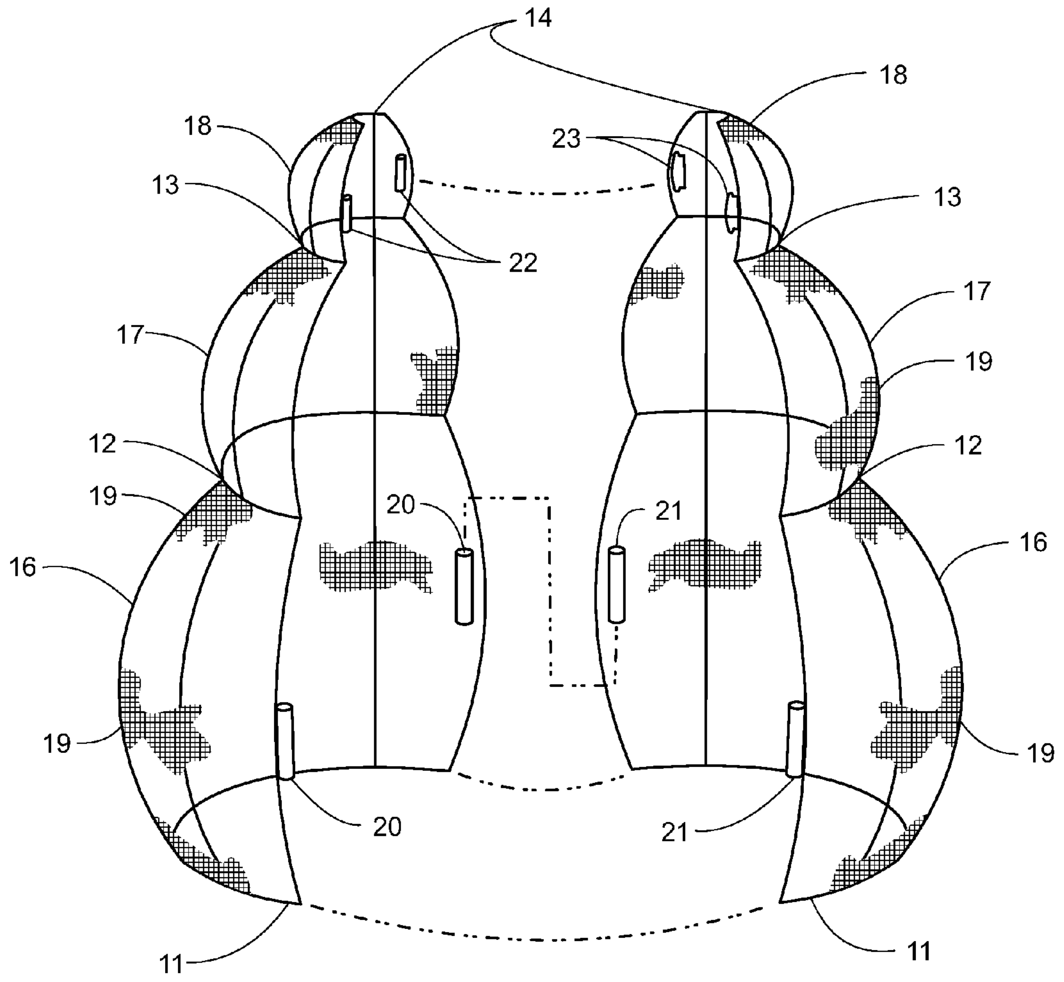
FIG. 2: is an exploded perspective view of the invention showing the embodiment with two halves of the armature.
Figure 3:
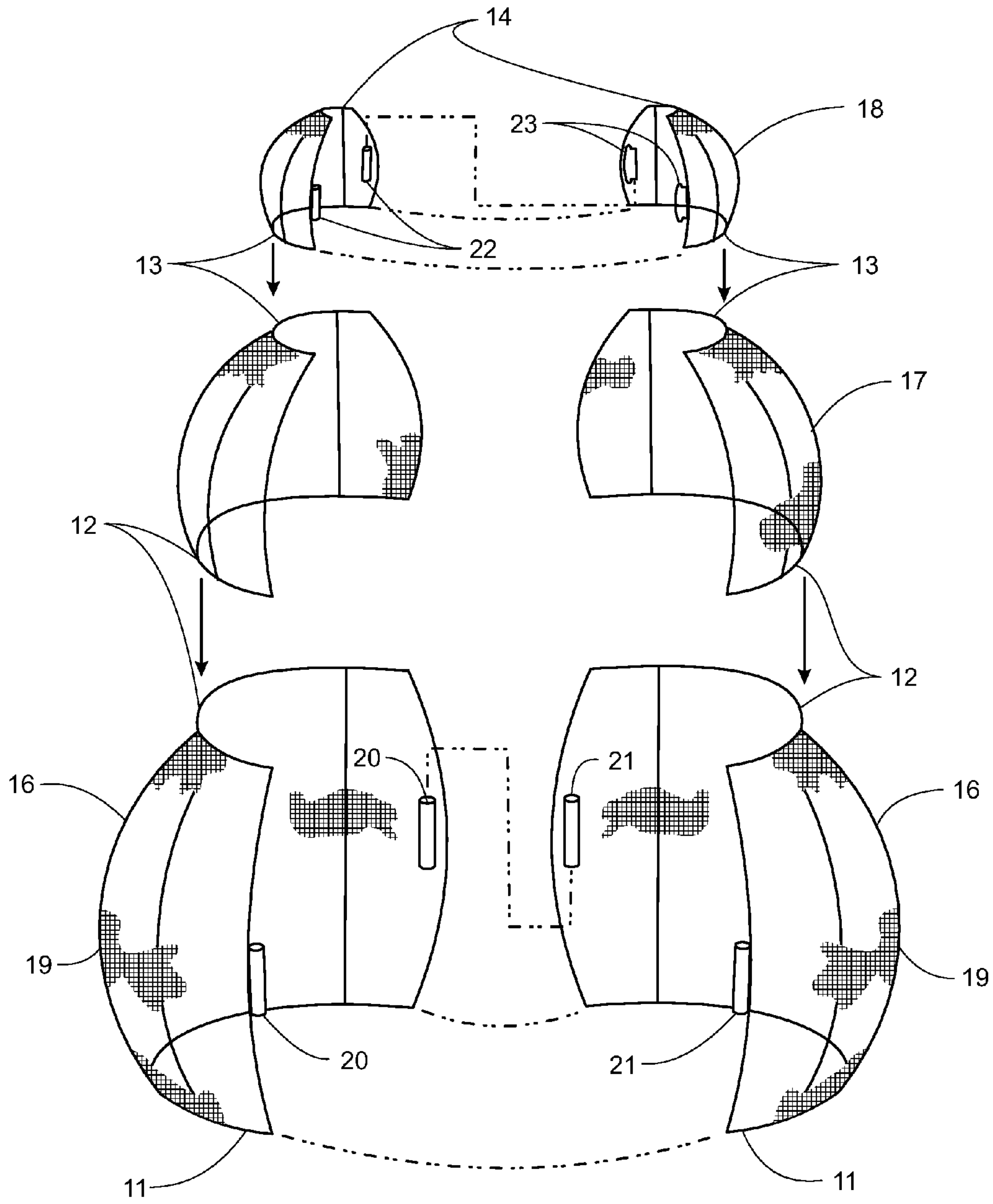
FIG. 3: is an exploded perspective view of the invention showing the embodiment of 6 pieces which are nestable for easy storage.

11: is the horizontal accurate member of the bottom segment
12: is the horizontal accurate member of the middle segment
13: is the horizontal accurate member of the top segment
14 is the horizontal accurate member of the of the crown of the top segment
16: are the vertical accurate members of bottom segment.
17: are the vertical accurate members of middle segment.
18: are the vertical accurate members of top segment.
19: is the screen mesh covering the support system.
20: are the solid pegs of the bottom segment.
21: are the hollow tubes of the bottom segment.
22: are the solid pegs of the top segment.
23: are the snap clamps of the top segment.
24: is a plastic button.
26: are the hooks that attach the decorative element to the screen mesh.
28: is a plastic carrot.
32: is a plastic arm.

DETAILED DESCRIPTION OF THE INVENTION

The armature of this invention has three round segments connected to form the familiar snowman shape. The segments consist of two major elements, the underlying support system and the screen with which the support system is covered. The two elements work in concert to hold the skin of snow and form the base snowman, which can be adorned with optional accessories.

The first element is a series of flat bars or round rods that form the support system of each segment and hold the screen (19) in place. For purposes of this invention these rods or bars are referred to as accurate members, of which there are horizontal (11-14) and vertical (16-18) members For purposes of this invention the support system can be constructed of metal, plastic, wood or any other stiff and strong material. In one embodiment of this invention the support system is made from metal. In another embodiment the support system is made from plastic.

Attached to the halves or segments of the frame are a series of solid pegs (20 & 22) and a hollow tube (21) which slides over the solid peg to lock the two halves together. Optionally the snap clamp (23) can attach to the solid peg (22) by means of spring action and will hold onto the outside of the solid peg without having to lower the tube onto the peg. The combinations of tubes and peg or snap clamp can be used interchangeably as the design calls for. As the size and shape of the figure varies, more or less of these attachment points can be utilized. In one embodiment of this invention four or more attachment points will be used to hold the separate pieces together.

Placed on top of the supports system is the screen mesh which will hold the snow in place. The screen can be made of any material that will withstand the cold of winter, will not crack when frozen and will not weaken when wet. For purposes of this invention the screen can be made of canvas, nylon, aluminum, plastic or fiberglass. The screen should have small holes or mesh size so that the snow does not easily fall into the frame. This mesh could be very small such as the weave of a canvas or heavy cotton fabric or it may be larger such as window screening or fine mesh wire. Large opening wire, such as those used for fencing with holes of greater than two inches should be avoided, as it will be difficult to get the snow to stick to the mesh. In an embodiment of this invention, the mesh or hole size should be less than one inch.

In another embodiment, the mesh will be less than ½ inch. One of ordinary skill in the art would recognize that the holes can be square, round, hexagonal, or any other shape and really has no bearing on the function of the screen.

Further the screen should have a minimum thickness such that the snow will be held in place and not fall off the frame. It has been found that a screen thickness of about ½ inch to about 4 inches provide a shelf for the snow to sit on and support the integrity of the snow on the outside of the figure. With a thickness of less than ½ inch the screen does not have enough support and the snow will quickly slide off the figure.

The screen is attached to the support system in a manner such as not to separate or detach under the load of snow. The screen can be attached by means of rivets, glue, screws, welds. If the support system is made from plastic, and the screen is also made of plastic, then the screen can be molded directly with the support system, thus making a continuous and unified structure.

In one embodiment of this invention the bottom segment can have a tube or other means to attach to the bottom of the segment for securing the frame to the ground. In an embodiment, the bottom of the bottom segment can have a tab with a hole for securing the frame to the ground. The frame can be secured to the ground with large nails or spikes. The purpose of securing the frame to the ground will be to prevent the structure from blowing away on the wind or being inadvertently knocked over during construction. In another embodiment of this invention, heavy weights may also be used in place of the stakes to hold the structure in place.

Figure 4:
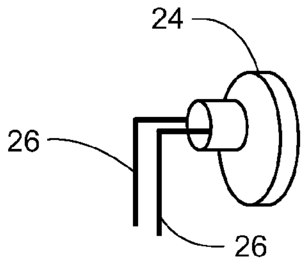
FIG. 4: is a detail perspective view of a decorative part of the invention which simulates lumps of coal.
Figure 5:
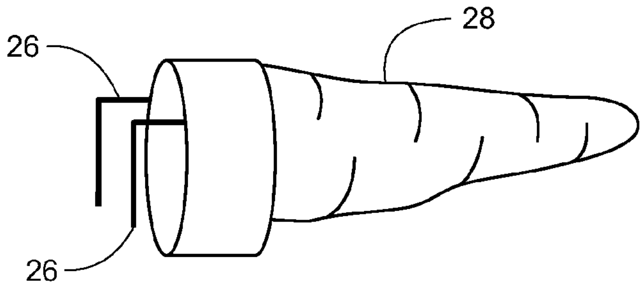
FIG. 5: is a detail perspective view of a decorative part of the invention that which simulates a carrot.
Figure 6:
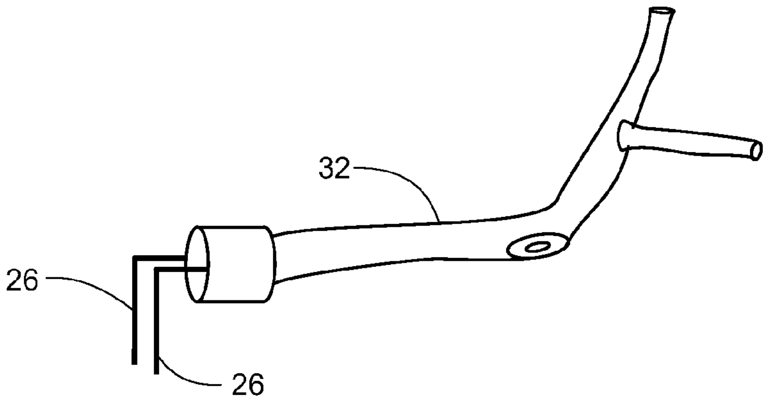
FIG. 6: is a detail perspective view of a decorative part of the invention which simulates a stick or branch.
Figure 7:
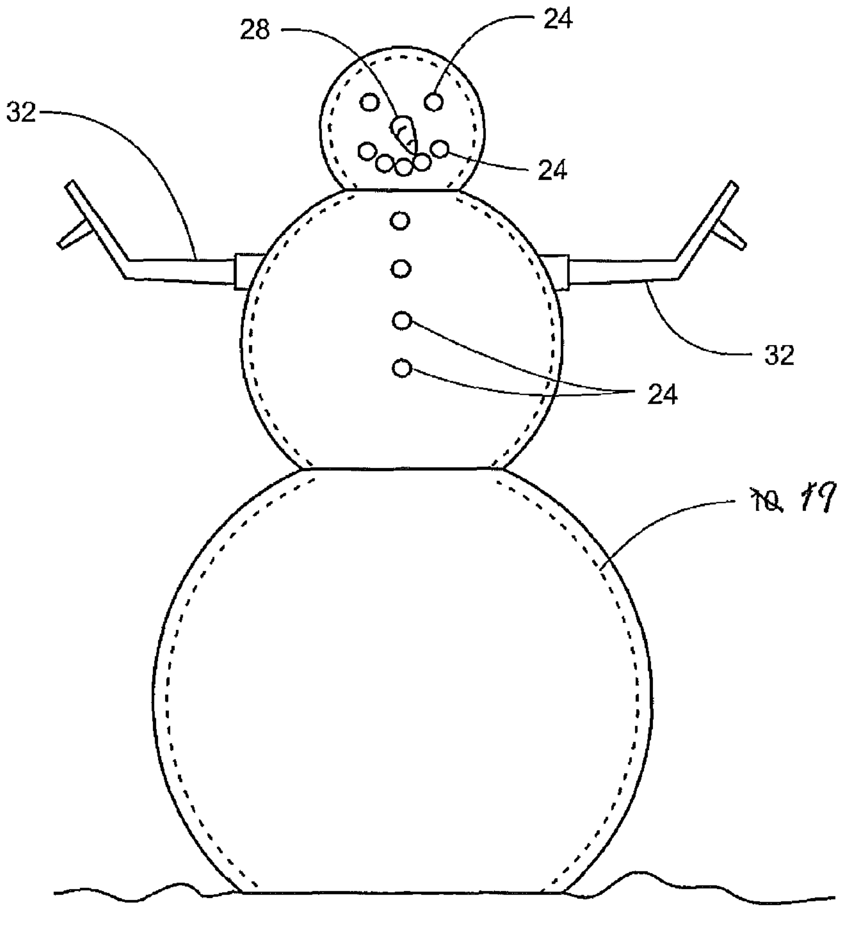
FIG. 7: is a front elevation view of the invention in use with the armature covered in a layer of snow and decorated with the optional accessories.

Special accessories for decorating the structure can be provided for easy assembly and removal. These accessories, FIGS. 4-6, can be attached by means of hooks (26) that will penetrate the covering of snow and latch onto the screen (19). These will allow them to be attached onto the surface of the snowman and to secure it in place (FIG. 7).

Other shapes and assemblies can be constructed using this method and are not to be considered outside the scope of this invention. These figures could include a snow dragon, snow Christmas tree and other seasonally appropriate designs.

What is claimed:

1. A method for making a snowman comprising the following steps:

a. assembling an armature by connecting one half of a frame to another half, each half of the frame having a half of a round bottom segment, a half of a round middle segment and a half of a round top segment, to form an armature having a bottom round segment, a middle round segment and a top round segment;

b. covering the armature with a screen; and c. placing snow on the screen to cover all the segments.

2. The method of claim 1, further comprising decorating the snowman.

3. The method of claim 2, wherein the decorations are a nose, a mouth, eyes, arms, buttons, or combinations thereof.

4. The method of claim 1, further comprising creating the segments from a series of bars or rods and holding the screen to the segments by means of the bars or rods.

5. A snowman armature comprising:

a. two half frames; each half frame having a half of a round bottom segment, a half of a round middle segment and a half of a round top segment; the two half frames being capable of being combined to form a snowman armature having a bottom round segment, a middle round segment and a top round segment;

b. at least one screen, capable of holding snow, covers all the segments; and c. a series of bars or rods which create all the segments.

6. The snowman of claim 5, wherein the screen has a hole size of less than 2 inches.

7. The snowman of claim 6, wherein the screen has a thickness of about ½ inch to about 4 inches.

8. The snowman of claim 5, wherein the screen is made of plastic.

9. The snowman of claim 5, wherein the bottom segment is attached to the ground by means of a nail or a spike.

10. The snowman of claim 5, further comprising an accessory for decorating the snowman, wherein the accessory has at least one hook sufficient to penetrate the snow and latch on to the screen.

11. The snowman of claim 5, wherein the bars or rods attach the screen to the segments.

12. The snowman of claim 5, wherein the screen has a hole size of less than 1 inch.

13. The snowman of claim 5, wherein the screen has a hole size of less than ½ inch.

14. The snowman of claim 5, further comprising at least one peg and at least one tube or snap clamp for connecting the two half frames together, wherein one or more of the one half round bottom segment, the one half round middle segment or the one half round top segment has a peg and its matching half round bottom segment, half round middle segment or half round top segment has a tube or snap clamp which connects to the peg.

* * * * *